United States Patent [19]

Stewart

[11] Patent Number: 5,248,872

[45] Date of Patent: Sep. 28, 1993

[54] DEVICE FOR OPTICALLY READING MARKED BALLOTS USING INFRARED AND RED EMITTERS

[75] Inventor: James D. Stewart, San Pablo, Calif.

[73] Assignee: Business Records Corporation, Dallas, Tex.

[21] Appl. No.: 740,808

[22] Filed: Aug. 6, 1991

[51] Int. Cl.⁵ .............................................. G06K 7/10
[52] U.S. Cl. ................................... 235/468; 235/454; 235/386; 235/475
[58] Field of Search ............... 235/454, 468, 456, 475, 235/440; 283/5

[56] References Cited

U.S. PATENT DOCUMENTS

| | | | |
|---|---|---|---|
| 4,217,487 | 8/1980 | Kjeer | 235/468 |
| 4,436,991 | 3/1984 | Albert et al. | 235/468 |
| 4,471,217 | 9/1984 | Engel | 235/468 |
| 4,471,384 | 9/1984 | Sato et al. | 235/469 |
| 4,479,194 | 10/1984 | Fogg et al. | 235/386 |
| 4,603,976 | 8/1986 | Fetzer et al. | 235/455 |
| 4,605,846 | 8/1986 | Duret et al. | 235/468 |
| 4,667,293 | 5/1987 | Krieger et al. | 235/472 |
| 4,795,894 | 1/1989 | Sugimoto et al. | 235/468 |
| 4,813,708 | 3/1989 | Narey | 250/566 |
| 4,924,088 | 5/1990 | Carman et al. | 235/468 |
| 4,937,439 | 6/1990 | Wanninger et al. | 235/456 |
| 5,001,330 | 3/1991 | Koch | 235/454 |

FOREIGN PATENT DOCUMENTS 2521747  8/1983  France .............................. 235/454

*Primary Examiner*—John Shepperd
*Assistant Examiner*—Esther Chin
*Attorney, Agent, or Firm*—Hubbard, Thurman, Tucker & Harris

[57] ABSTRACT

A read head for optically scanning a ballot on which votes are cast by marking the ballot with a writing instrument within a voting area defined between a pair of spaced-apart timing marks includes infrared emitters illuminating the timing marks and emitters of visible light illuminating the voting area between the marks. The illuminated portions of the ballot are imaged onto three PIN photodiodes place in a line. The outer two PIN photodiodes are effectively apertured to resolve the timing marks and the middle PIN photodiode is effectively apertured to resolve a voting mark of a predetermined minimum size. The ballot, the image and the apertures are carefully aligned such that the photodiodes detect changes in light level associated with an image of a mark passing across the apertures.

23 Claims, 4 Drawing Sheets

DEVICE FOR OPTICALLY READING MARKED BALLOTS USING INFRARED AND RED EMITTERS

FIELD OF THE INVENTION

The invention pertains to machines for counting marked ballots, and more particularly to ballot reading apparatus and methods.

BACKGROUND OF THE INVENTION

The integrity of elections and referendums, both public and private, rests upon, among other things, very accurate counting or tabulating votes made by ballot. Typically machines are used to tally votes made by ballots, as manual counting is generally too slow slow and unreliable for most elections. It is easy to assume that these machines are perfectly accurate; and they generally are becoming so, with fewer ballots being rejected and requiring special processing. However, achieving this nearly perfect accuracy—and reliability—is a demanding task where the need, or desire, for quick "returns" is becoming overwhelming. Vote counting machines are expected to provide the same, or better, accuracy, while increasing the number of ballots that can be processed.

The task is further complicated when "marked" ballots are used. Marked ballots are preprinted with the names of candidates (though there is often available a choice for a write-in candidate) or other choices (i.e. "yes" or "no" to propositions) that are being voted on. Ballots are in essence a form of a multiple-choice questionnaire. A voter votes or selects a choice by making some sort of indication next to the printed name or choice. The marked ballot requires a pen or pencil be used to draw a mark on the ballot to indicate a vote or selection. Accurate counting of marked ballots requires optically scanning the ballots, reliably detecting or reading each and every hand written mark on a ballot and recognizing that it is a valid vote or choice.

There are numerous different methods and apparatus pertaining to optically scanning documents, and detecting and recognizing marks on them. Most use some sort of pre-printed form and a scanning device that is adapted to the particular format. For example, one such ballot format is that described in U.S. Pat. No. 4,813,708, which is hereby incorporated by reference. Next to a printed column of candidates or choices are printed two columns of timing or clocking marks placed horizontally apart. The clocking marks are in columns, each column being referred to as a clocking channel. The space between the columns is referred to a as mark channel. A vote is cast or a selection made by drawing or writing a mark in a space between a pair of timing marks next to the candidate or choice. Only a written mark occurring between a pair of timing marks is a valid vote that is counted. Any other stray marks are ignored.

The scanner that has been used to detect timing marks and written marks includes a read head that has tungsten lamps illuminating the ballot with infra-red light and three photo-Darlington phototransistors, aligned in a row, to sense infra-red light reflected from the surface of the ballot. A ballot to be scanned or read is transported past the row of phototransistors in a direction of the columns of the marks and perpendicular to the row of sensors. In other words, each of the three columns is scanned from the top of the ballot to the bottom. A lens focuses the image of the illuminated ballot on to the three phototransistors, with the image of each column of timing marks being focused with a lens onto one of the two outboard phototransistors and the image of the channel being focused onto the center phototransistor. The ink used for printing the timing marks and writing the marks absorbs infra-red light. Therefore, when a phototransistor senses a significant drop of brightness in the infra-red light reflected from the ballot, it is likely due to a passing mark. When all three photodetectors sense a drop in infra-red light, a mark indicating a valid vote has been detected and a vote is recorded.

Such a scanner has several disadvantages. First, although the use of timing marks significantly reduces the risk of detecting stray marks, the scanner is not able to distinguish in all situations between stray marks that may be written (accidently or intentionally) by a voter on the ballot and valid timing marks. Should stray marks in the timing channels be interpreted as false timing marks, the ballot must be rejected and hand counted. Second, most common pens do not use ink that absorbs infra-red light. Therefore, special pens with infra-red absorbing ink must be used to mark the ballots, making marked ballot systems less acceptable to voter jurisdictions.

Other disadvantages of this scanner involves its use of photo-Darlington phototransistors. Though their intrinsic gain is large, simplifying amplification circuitry in the read head and making it easier to detect a drop in their output level due to a mark absorbing the infra-red light, the gain varies greatly between individual phototransistors, even within the same production run. The difference in gain may be as great as a factor of 2. The large gain variations complicate the reliable detection of timing and vote marks.

It is also difficult to control what the phototransistors are looking at and, more particularly, the size of the mark that they are resolving. The phototransistors are placed in a package about the size of a grain of rice. The package includes a bead of glass over the light-sensitive silicon portion of the photo-Darlington transistors. Even though the photo-Darlington package is properly placed and mounted such that the image of a column of marks, as it is scanned, is incident on it, the bead of glass interferes with detection of the levels of light. The bead of glass is effectively a distorted lens, since it appears to have a poorly controlled geometry introduced by its manufacturing process. Consequently, a great deal of manufacturing time must be spent sorting and rotating the photo-Darlington transistors to find one that has sufficient sensitivity to changes in light incident on it.

Finally, the phototransistor's frequency response is slow. As the speed of the ballots being transported past the scanner, and so too the speed of the marks, are increased, the frequency of fluctuations of light indicating the presence of the marks begins reaches the ability of the phototransistor to respond to the fluctuations. The limit of the phototransistor's frequency response has been found to correspond to approximately 100 to 200 ballots per minute. The speed of counting ballots is therefore limited by use of the photo-Darlington phototransistors as sensors.

SUMMARY OF THE INVENTION

Overcoming the various disadvantages of the previously described scanner or read head for a ballot counting machine, an improved read head (as well as method)

for optically scanning the ballot scans at much quicker rates, corresponding to the 800 to 1000 ballots per minute, with improved rejection of invalid marks and control over imaging for greater reliability and better detection of marks.

The improved read head utilizes an improved method of illuminating the ballot and detecting the marks to improve speed and reliability. The improved illumination method involves using two different types of light emitting diodes to illuminate a portion of a ballot that is being imaged. Two infrared LEDs are positioned to shine directly on each column of timing marks on a ballot. As timing marks are printed on a ballot using ink that readily absorbs infrared light, they will absorb light, thereby reducing the amount of infrared light imaged. The column in which voting marks are made is illuminated with two red LEDs that emit visible red light. Inks, except for red ink, common in pens and writing instruments absorbs this visible red light. Therefore, a voter is able to use most types of writing instruments. Moreover, any stray marks that may be made by a voter in the timing channels or columns is not detectable.

To improve speed and accuracy in detecting marks, PIN (Positive Intrinsic Negative) photodiodes replace photo-Darlington transistors. Though photodiodes are generally thought to be unsuitable because of their very low gain, they have much higher frequency response, permitting much faster scan rates. PIN photodiodes also have generally linear responses, and vary little in output from part to part. Therefore, problems with matching gains during manufacture are avoided. Another important benefit of PIN photodiodes have light-sensitive areas much larger than the size of the timing and voting marks and do not have a bead of glass or other features that interfere with imaging marks on them. The PIN photodiodes are masked to define apertures over each of them. The apertures have precisely defined dimensions, permitting accurate control over the size of the marks that may be resolved by each photodiode. Very small or narrow voting marks may now be reliably detected, and the time and costs associated with experimentally adjusting photo-Darlington transistors to achieve the desired detection of the image of marks incident on it eliminated.

These and other advantages of the invention are discussed or will be otherwise apparent from the following description of the preferred embodiment of the invention, its illustration in attached drawings, and the appended claims.

DETAILED DESCRIPTION OF THE PREFERRED EMBODIMENTS

Figure 4:
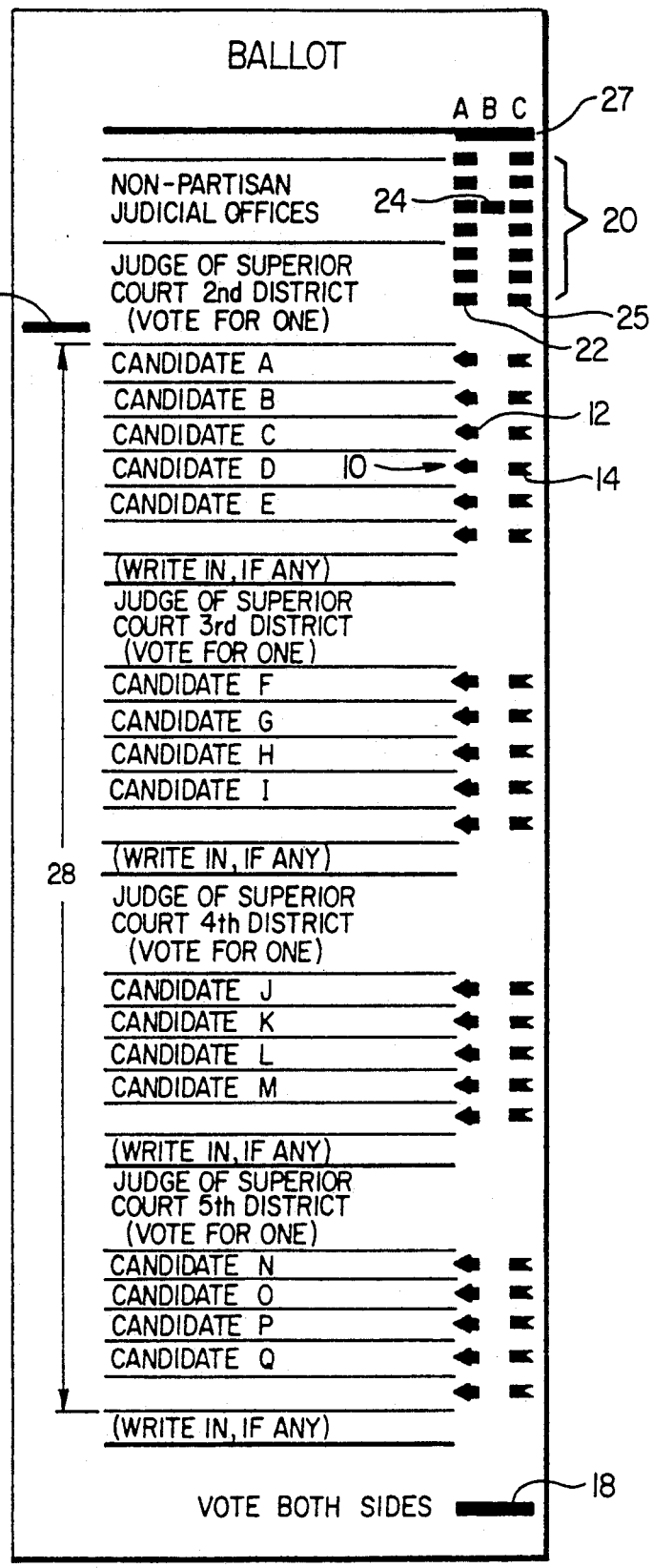
FIG. 4 is a sample of a typical ballot that the device of the present invention is designed to read.

Referring to FIG. 4, the ballot has a style or configuration code 20 located in the upper right-hand side. The style code 20 comprises timing marks 22 and 25 along with numerically assigned value binary data marks 24. When this ballot is placed into a scanning reader, the binary coded style number is read to determine the identity and location of the particular choices listed on the ballot. Columns A and C include seven bars, and each row of the seven bars has a unique assigned numerical value. The bars in columns A and C are timing marks and, between them, is a binary data bit, either 1 or 0, calling for the inclusion or exclusion of its assigned numerical value in forming the sum which represents the encoded style number.

The index mark 27 above the right-hand column of the style code 20 serves as a demarcation mark which alerts the reading system to the coded information which follows.

The index mark 16 on the left of the ballot also serves as a demarcation mark which alerts the reading apparatus to stop reading the style code 20 and to start reading the body of the ballot. The assignment of the style code data bits are from the bottom to the top, in binary counting places, hence 1, 2, 4, 8, 16, 32, 64, to constitute the seven positions on the style code 20.

The remaining portion or body of the ballot constitutes a candidate list 28 which extends from the first-named candidate (or election choice), to the last line, which is reserved for a write-in vote. In connection with the reading of the body of the ballot, the reader apparatus reads the timing marks 12 and 14. In between these timing marks, that is, in column B, an inserted mark will indicate a vote, and no mark will indicate an absence of a vote.

Figure 1:
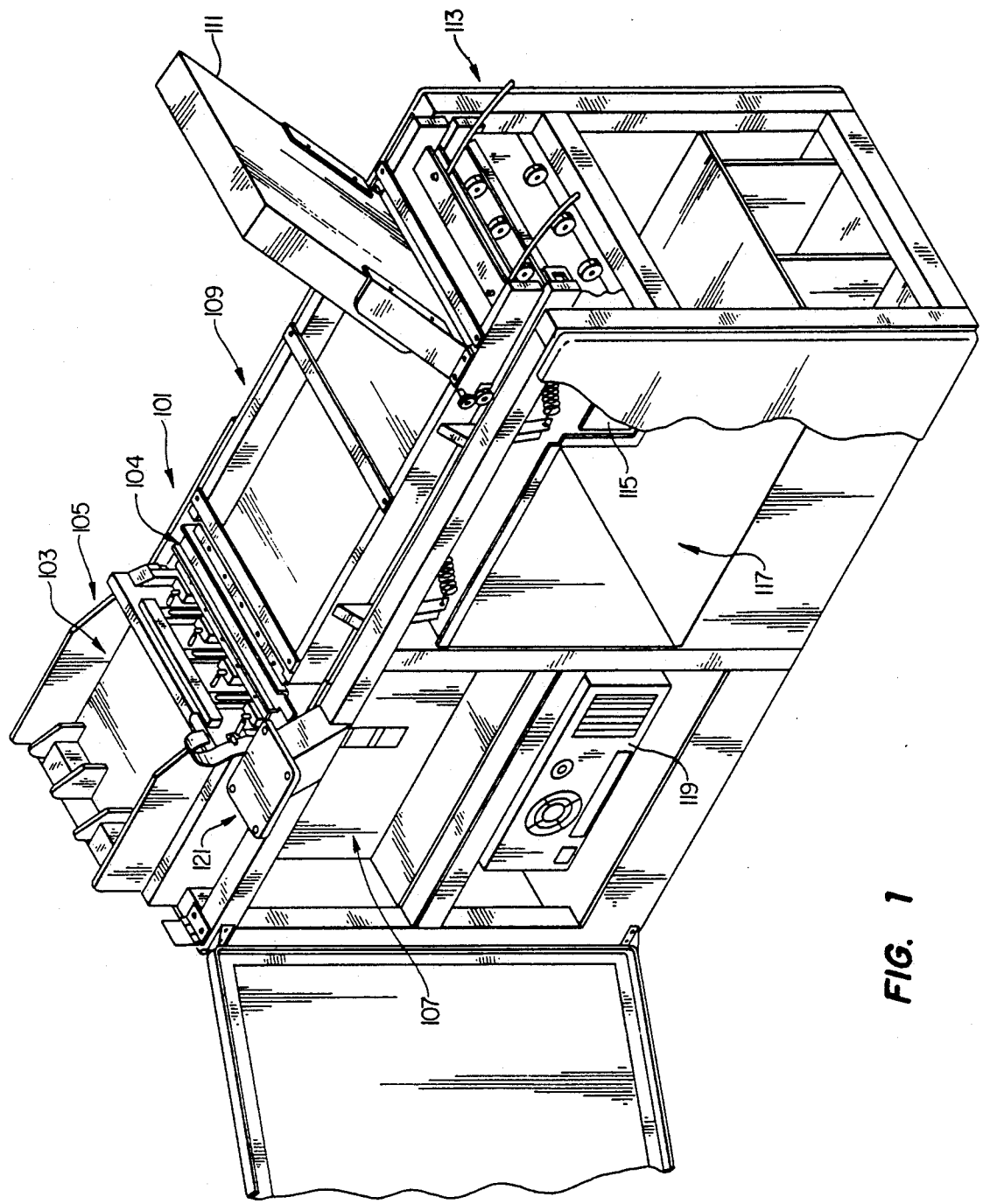
FIG. 1 is a perspective drawing of a typical vote tallying machine.

Referring now to FIG. 1, illustrated is a ballot tabulation device 101 designed to count ballots on election night at a centralized location. A preferred embodiment of the ballot tabulation device 101 is an OPTECH IV-C system made by Election Services Division of Business Records Corporation of Dallas, Tex. Marked ballots (not shown) are placed in hopper 103 of ballot feeder 105. To feed a ballot past read head for scanning, two pick solenoids (not shown) pull down a finger plate (not shown) and pick a ballot. A one quarter horsepower electric drive motor mounted within drive motor compartment 107 drives the ballots from feeder 105 down a ballot transport 109. The ballot transport includes a roller assembly, driven by the drive motor, that carries the ballot away from read head 104 to one of three places: an outstack tray 111 for rejected ballots (for invalid ballots or those that cannot be read); out the end 113 of the ballot transport 109 for dropping into a hopper (not shown) if they ballots have been successfully read; or, if the ballots have a write-in vote, into a turn around assembly 115 for deposit into a hopper placed in cavity 117. Two diverter solenoids are used to actuate diverters placed along the ballot transport path 109 to divert ballots into the outstack 111 or the turn around assembly 115.

Located along the path that each ballot travels from feed hopper 103 along ballot transport 109 are ballot path sensors comprised of light emitter and detector pairs (not shown). The emitters are light emitting diodes (LEDs) that emit visible red light with high levels of brightness. To eliminate the effect of ambient lighting, the LEDs are modulated at a rate of 20 kilohertz. The detectors are photo-Darlington transistors. An output signal from the detectors is passed through a band pass switch capacitor filter centered at 20 kilohertz, clamped and provided to a synchronous demodulator for generating a signal indicating the state of the ballot path sensor, i.e. whether or not the modulated light from the LED is blocked by a ballot.

A computer 119 controls the operation of the ballot tabulation device 101 through an adaptor board (not shown) coupled to the pick and diverter solenoids, as well as to the ballet path sensors. The adaptor board is coupled to the computer 119 through a pair input ports. The inputs to the adaptor board are the signals from the ballot path sensors. The adaptor board includes interrupt circuitry that generates an interrupt when any of the ballot path sensors change state. On the adaptor board, there is a pair of output ports and comparators. The computer reads the state of the path sensors and writes the state into the output ports. The status of the path sensors are connected to one side of the comparators and the output ports are connected to the other side. If any of the path sensors change, the comparator changes states and generates an interrupt for the computer.

There are several sensors along the ballot. A hopper sensor station indicates whether the ballot hopper 103 is empty. A pre-read sensor station detects a ballot immediately prior to the read head for control of ballot picking. A post-read sensor station located a few inches after the read station indicates that a ballot has made the transition from the feed hopper 105/read head 104 mechanism into the ballot transport 109. A pre-outstack sensor station located a few inches prior to the outstack diverter serves as a signal to energize the diverter, if required, when the ballot is detected at this point. A pre-write-in sensor station located in the main path of the ballot transport 109 after the outstack diverter gate detects ballot which may not have been properly outstacked and serves as a signal for the write-in diverter to be energized if required. The main stacked sensor station assures that ballots intended for the main processed ballot hopper have successfully reached the output diverter gate for the main bin, and also that ballots, which should have been outstacked or routed to the write-in bin have not bypassed the respective diverter gate. A write-in turn sensor station indicates the travel of a ballot around the write-in turnaround area. A write-in stacked sensor station indicates the end of the write-in path. And an outstack sensor station located in the outstack tray 11 area insures that ballots being outstacked reach the tray.

Bits on an output port of the adaptor board control the operation of the diverter solenoids and the pick solenoids.

Therefore, essentially, these machine control functions—starting and stopping the drive motor 107, picking of ballots and diverting of ballots into their respective bins, hoppers or trays—are handled by the programmed computer 119 in the "background" with interrupts from the ballot path sensors. In the "foreground", computer 119 is running programs for ballot image processing and vote tallying that will be subsequently described.

To handle all of these tasks, the computer 119 requires, at minimum, microprocessor such as the 80286 microprocessor made by Intel Corporation, operating at 12 megahertz. Furthermore, 640 kilobytes of memory must be located on the mother board of the computer, and a 40 megabyte hard disc drive and an expansion bus which is compatible with the IBM PC/AT standard is required. Although not shown, also attached to the computer are a removable alphanumeric keyboard and a monitor that are mounted on support 121. Attached to the computer is a parallel port controller board, a serial port/parallel port controller board, and the adaptor board. The parallel ports on the computer are brought out to a connector panel where they drive a report printer and a log printer, respectively. One of the serial ports may be brought out to the connector panel to be used for an RS-232 network or a MEMPACK Receiver made by Business Records Corporation. If an 80286 microprocessor based personal computer is used, a LIM 4.0 Extended Memory Board is also required for processing large jurisdictions with different ballot styles intermixed. Ethernet adaptor boards and modems may be added.

Figure 2:
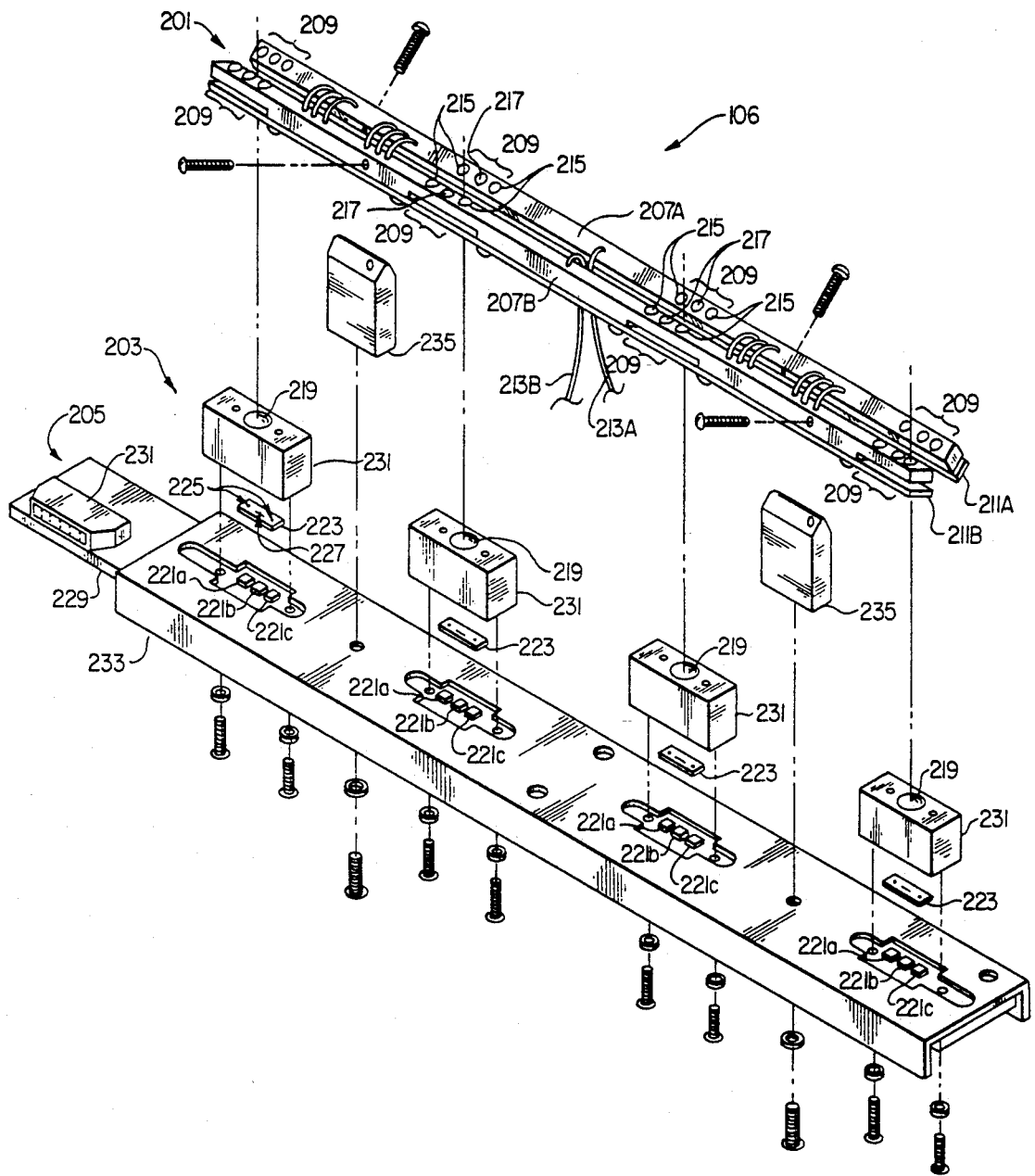
FIG. 2 is an exploded perspective or assembly drawing of a read head for scanning optically scanning ballots.

Referring now to FIG. 2, read head assembly 106 includes three major subassemblies; illuminating subassembly 201; lens subassemblies 203; and printed circuit board (PCB) subassembly 205. The read head assembly has four essentially identical segments or reading stations. Each reading station includes two oppositely disposed groups of illuminating lights 209, one lens 219 mounted in a lens housing 231; an aperture defining piece of material 223; and three photodiodes. The components of each reading station are carefully aligned with respect to each other and with respect to a ballot being scanned.

The groups of illuminating lights 209 are mounted through two aluminum illumination bars 207a and 207b. There are three such lights in each group 209, each a type of light emitting diode (LED). The three LEDs in each group are lined in a row and spaced apart at a distance substantially equal to half the distance between pairs of timing marks on a ballot. Each is oppositely disposed from a group located on the opposite illuminating bar. When properly oriented with respect to columns of timing marks on a ballot, each outside pair of oppositely disposed LEDs 215 illuminate timing marks on a ballot as they pass by the read head in a column during scanning of a ballot. The pair of oppositely disposed middle LEDs 217 illuminate a voting area defined between pairs of timing marks in which voting marks are made.

Within each group of LEDs 209, the two outer LEDs 215 are infra-red emitting LEDs that illuminate timing marks with infra-red light. The middle LEDs 217 emit visible red light for illuminating voting marks. The infrared LEDs 215 are mounted outboard on either side of the red LED. Timing marks on a ballot are printed with an ink that absorbs infrared light. Pens that are used to make a voting mark may not absorb infrared light, but absorb visible red light (except for red ink pens).

The illuminating bars are angled inwardly with respect to each other so that the full intensity of each LED is directed at the same spot on the ballot. The LEDs are inserted into a circuit board 211a and 211b for delivering power to the LEDs. The circuit boards 211a and 211b are attached to the illuminating bars 207a and 207b. Power is delivered to the circuit boards 211a and 211b by pairs of power leads 213a and 213b from PCB 205.

Lens 219 is small focal length lens that focuses an image of an illuminated area of a ballot onto a focal plane defined by three apertures defined with aperture forming material 223 or, since the aperture forming material overlays PIN (Positive Intrinsic Negative) photodiodes 221, with the surface of these photodiodes. A fresnel lens may also be used to alleviate some problems with properly aligning the lens.

The aperture forming material 223 is a thin sheet of opaque material in which are precisely defined a pair of apertures 225 that are each a circle approximately 15 millimeters in diameter. Between apertures 225 is defined an aperture 227 that is an oval having the dimensions of approximately 15 millimeters by 35 millimeters. These apertures formed in a line, and each passes light incident on it through to one of the three underlying PIN photodiodes 221. Apertures 225 overlay the outboard PIN photodiodes 221a and 221c and are used to define a small portion of an image of the ballot in which timing marks are expected to appear. Apertures 225 are of a size that is able to effectively resolve the presence of a mark about half the size of a clocking mark by a change in infrared light level sensed by the underlying PIN photodiodes (assuming detection circuitry is properly adjusted). Aperture 227 overlays the middle PIN photodiode 221b and defines a small portion of the image of the illuminated portion of the ballot in which an image of a voting mark, if any, is expected to appear. Aperture 227 has dimensions that are capable of resolving a mark as small as 0.015' or 1/67 of an inch wide within the voting marks area between the timing marks.

Aperture forming material 223 may be a piece of thin sheet stainless steel having precisely defined aperture openings that have been etched using a well-known precise chemical milling process. It may also be formed from a piece of stock photographic negative film. The apertures then are clear areas in which there is no emulsion over the clear film and the remainder sheet opaque. Such apertures may be precisely defined using a well known "photo plotting" process. The advantage of the sheet of stainless steel is that references may be made to permit accurate alignment of the aperture openings with respect to the lens 219. The photographic negative film if it is used, is held directly on top of the photodiode with two-sided optical tape. Stainless steel has the advantage that reference holes may also be etched to provide for alignment of the apertures with the PCB subassembly 205 during assembly.

The PIN photodiodes 221 are mounted on PCB 229. To maintain the proper geometrical relationship between lens 219 and apertures 225 and 227, a lens housing 231 supports lens 219. PCB 229 is attached to mounting plate 233. Also attached to mounting plate 233 are illumination bar supports 235. Illumination bar supports 235 position the groups of LEDs 209 close to the ballot for proper illumination and are spaced apart such that an image of the ballot can be focused onto the apertures 225 and 227. for connection to the computer 119 (FIG. 1), a plug 231 is provided.

Although the preferred use, the read head is not limited to the ballot counting device 101, and may be used in a wide variety of such machines and other optical scanners for scanning documents other than ballots. Furthermore, the arrangement of the reading stations may be adapted to different formats used by pre-printed forms, including those other than ballots. For example, different numbers or arrangements of timing marks can be used to clock reading of hand-written marks within predefined areas.

Figure 3:
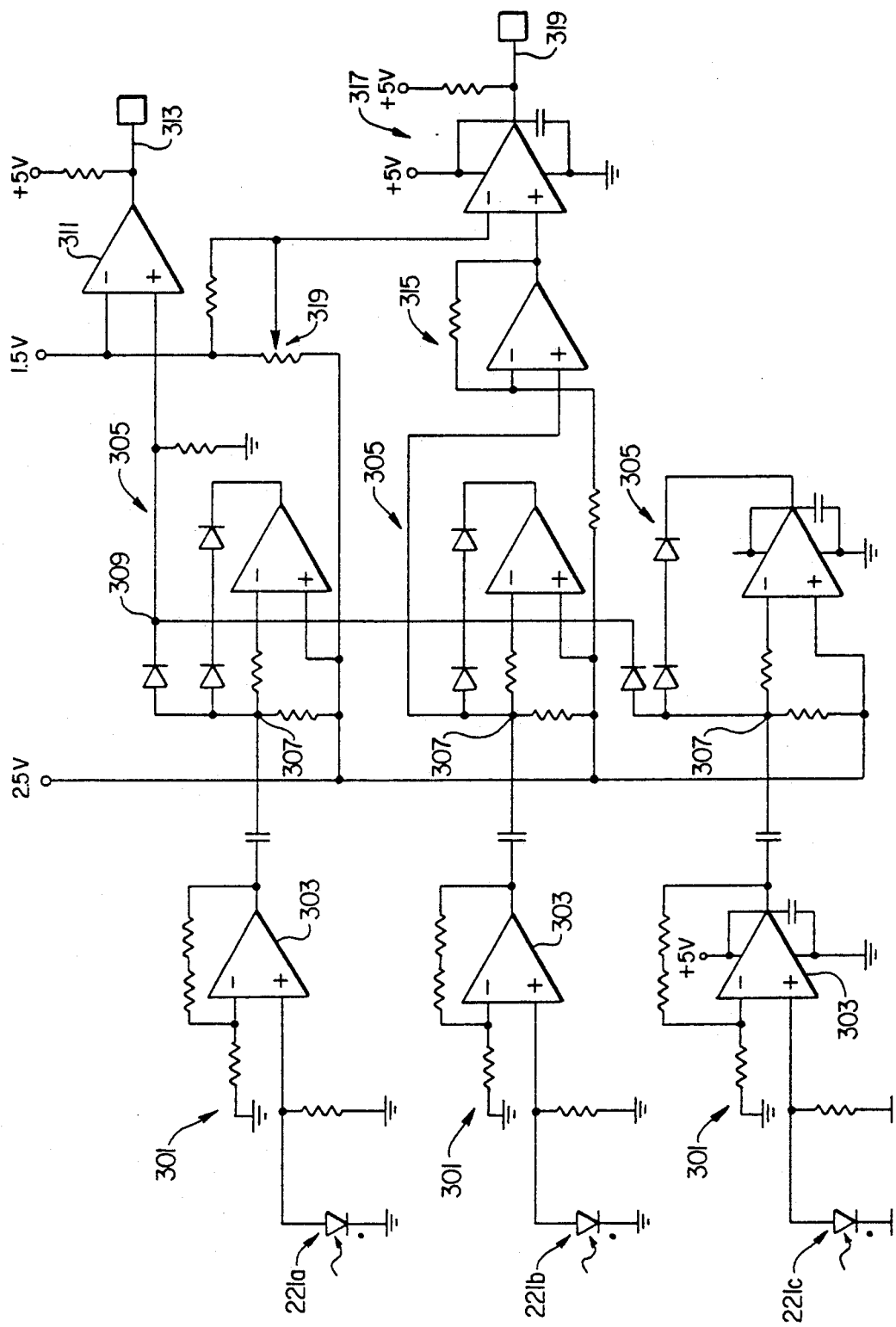
FIG. 3 is a schematic diagram of an electronic circuit for detecting changes in light from a grouping of three PIN photodiodes used to detect the presence of two timing marks and a voting mark in an image of a properly illuminated ballot.

Referring now to FIG. 3, shown is schematic diagram of the detection circuitry for one reading station that is mounted on a reverse side PCB 229 (FIG. 2). There are four such circuits, one for each of the four reading stations on the read head. On lead of each PIN photodiode 221 is coupled to a non-inverting preamplifier circuit 301 for amplification of the voltage generate by the PIN photodiode, as the level is very small. Preamplifier circuits 301 utilize op-amps 303 having feed back loops with resistances that provide a gain of from 20 and 30.

The output of each preamplifier 301 connected to a standard clamp circuit 305. When the output level of a preamplifier 301 begins to rise, a clamp circuits 305 rapidly slews the output level up to a 2.5 volt reference level. However, when the preamplifier output voltage level begins to decrease below the reference level, indicating a decrease in intensity of the light detected by a photodiode 221 that corresponds with a passing of a mark, the voltage at input 307 falls linearly from the 2.5 volt with the output. The clamp circuit for PIN photodiode channel permits the use of paper for ballots having different background or "white" levels without adjustment for the different intensities of light associated with the background.

The clamped preamplifier output signals for photodiodes 221a and 221c (used for detecting timing marks) at junction 307 are, due to the arrangement of the circuitry, effectively logically ANDed together at junction 309. The ANDed signal is provided to a comparator circuit 311 having a preset reference level. The output of the comparator circuit 311 on line 313 is a signal having discrete levels representing a logical data value.

The drop in the voltage level of PIN photodiode 221b tends to be weak when compared to that for a timing mark because the ink using to make the voting marks tend not be as strongly absorbent of red light as the ink used to print the timing marks is of infrared light. Consequently, the clamped preamplifier output for the PIN photodiode 221b is first amplified by amplifier circuit 315 before being given to comparator circuit 317. Comparator circuit 317 has a compare level that may be varied using potentiometer 319 during assembly. The output of comparator 317 is provided on line 319 as a logic level signal representing a data value.

The adaptor board for computer 119 (FIG. 1) includes circuitry for periodically sampling the signal output on lines 313 and 319 at a rate of about 26,000 times a second and stores their data values in random access memory (RAM) memory in the computer to create an "image" (of sorts) of the ballot. The sampling rate is chosen to ensure that the entire ballot is scanned and is determined by the speed of the ballot and the sizes of the apertures 225 and 227 (FIG. 2). Fast sampling produces a relatively high resolution "picture" of the ballot. For example, at a sampling rate of 26,000 Hertz and with a ballot moving at 7½ millimeters per second, a 15 millimeter tall mark is sampled twice with a 15 millimeter aperture. If greater resolution of the ballot in the image is desired for improving recognition of marks in the image, the sampling rate is increased.

To facilitate transfer of the data, as well as to free up the microprocessor in the computer for ballot image processing, the adaptor board utilizes a 16 bit wide direct memory access (DMA) channel of the computer 119 to write the data directly into succesive lines of RAM. The 16 bit wide DMA channel permits 8 reading stations—eight read heads, one scanning the front side of a ballot and the other scanning the back side of the ballot each having two data bits—to be sampled simultaneously and written to RAM. In order to facilitate processing, the data sampled from the reading stations are grouped into two different 8 bit words. In one word, all of the data bits for timing marks are placed, and placed in the other are the bits for the voting marks. As the image of the ballot is being stored, the computer 119 begins ballot image processing immediately, if possible, and no later than the time the image of a ballot is completely written to RAM. First, the orientation of the ballot is determined from marks on the ballot. Next, the ballot style is determined, again from a code of marks on the ballot. A different ballot style is usually required for each voting precinct, even though some of election contests or offices may be jurisdiction-wide. Ballots do not need to be sorted before being placed in the ballot hopper 103 (FIG. 1), as a description of each ballot style, called a template, is stored by the computer and recalled during processing. As the number of ballot styles may be very large, the 640 K of memory that is addressable by the computer 119 is sometimes insufficient to hold descriptions of all the ballots. Therefore, the templates are stored in EMS memory, into which the computer pages to pull up into working memory the template for the ballot style code. The computer then checks the timing marks, to see if there is the proper number and that they have the correct relative positions. The voting marks are then found, correlated with the choice or candidate corresponding to the timing marks next to which the voting mark appears, and then added to tallies kept in the template. The template is then swapped backed into EMS memory.

After the image of the ballot is processed, the image of the next ballot is captured. Except when the computer is in a maintenance or diagnostic mode, the image of the next ballot is written into the RAM, over the previously imaged ballot.

While the present invention has been described with a reference to a few specific embodiments, the description is illustrative of the invention and is not to be construed as limiting the invention. Various modifications may occur to those skilled in the art without departing from the true scope and spirit of the invention as set forth by the appended claims.

What is claimed is:

1. A read head for optically scanning votes cast on ballots by handwritten marks made within a voting area spatially related to a printed timing mark and corresponding to a choice, the read head comprising:
    means for illuminating a portion of a ballot having a first column of timing marks printed in an ink that absorbs infrared light and a second column of voting mark areas in which voting marks are handwritten, each voting mark area spatially aligned with a timing mark; the means for illuminating including:
        a first emitter for illuminating a portion of the first column of timing marks with substantially infrared radiation; and
        a second emitter for illuminating a portion of the second column of voting mark areas with substantially red radiation; and
    means for electronically capturing an image of the illuminated portion of the ballot including:
        lens means for focusing an image of the illuminated ballot;
        light sensing means for receiving the focused image, the light sensing means including first and second light sensors; first and second light sensors being positioned to receive, respectively, the image of the illuminated portion of the first column of timing marks and the image of the illuminated portion of the column of voting mark areas, the first light sensing means being responsive to infrared radiation and the second light sensing means being responsive to red radiation; and
        electronic means coupled to the first and second light sensors for detecting changes in output levels of each light sensors and for indicating that an image of a timing mark and a voting mark has been received by the light sensing means.

2. The read head of claim 1 wherein first and second light sensors are photodiodes, and wherein the means for electronically capturing an image further includes aperture forming means overlaying the photodiodes to define the portions of the image of the illuminated portion of the ballot to be sensed.

3. The read head of claim 2 wherein the aperture forming means includes:
    a first aperture overlaying the first photodiode, the first aperture having dimensions providing resolution for at least a portion of a timing mark; and
    a second aperture overlaying the second photodiode, the second aperture having dimensions providing resolution of a voting mark of a predetermined minimum size.

4. The read head of claim 2 wherein the electronic means includes:
    amplifier means for amplifying an output signal from each photodiode;
    clamping means for clamping the amplified output signals of each photodiode to a predetermined white level for images of backgrounds for all ballots; and
    comparator means for comparing the output signal of the first photodiode with a first predetermined reference level signal and for comparing the amplified output signal of the second photodiode with a second predetermined reference level signal to produce a first logic signal indicating detection of a timing mark and a second logic signal indicating detection of a voting mark.

5. The read head of claim 2 wherein the read head is coupled to a means for transporting the ballot past the read head for scanning down the first and second columns of marks on the ballot.

6. The read head of claim 5 wherein the electronic means indicates with a first logic output signal detection of a timing mark and with a second logic output signal detection of a voting mark, and wherein the read head is coupled to data processing means, the data processing means sampling the first and the second logic signals at a predetermined rate as the ballot moves past the read head and storing the sampled first and second logic signals in a memory, thereby capturing an electronic image of the first and second columns.

7. A read head for optically scanning votes cast on ballots by handwritten marks, the read head comprising:
    means for illuminating a portion of a ballot having a first column of timing marks printed in an ink that absorbs infrared light and a second column of voting mark areas in which voting marks are handwritten, each voting mark area spatially aligned with a timing mark; the means for illuminating including:
  a first emitter for illuminating a portion of the first column of timing marks with substantially infrared radiation; and
  a second emitter for illuminating a portion of the second column of voting mark areas with substantially red radiation;
lens means for focusing an image of the illuminated ballot;
a first photodiode being positioned to receive a part of the image of the illuminated ballot portion containing an image of the column of timing marks, and a second photodiode for receiving a part of the image of the illuminated ballot portion containing an image of the column of voting mark areas;
aperture forming means having defined therein first and second apertures overlaying, respectively, the first and second photodiodes, the first aperture having predefined dimensions capable of resolving timing marks and the second aperture having predefined dimensions for resolving voting marks having a predetermined minimum size; and
electronic means coupled to each photodiode for detecting changes in output levels of the photodiodes and for indicating that an image of a timing mark and a voting mark has been received by photodiodes.

8. The read head of claim 7 wherein the electronic means includes:
  amplifier means for amplifying an output signal from each photodiode;
  clamping means for clamping the amplified output signals of each photodiode to a predetermined white level for images of backgrounds for all ballots; and
  comparator means for comparing the output signal from the first photodiode with a first predetermined reference level signal and for comparing the amplified output signal of the second photodiode with a second predetermined reference level signal to produce a first logic signal indicating detection of a timing mark and a second logic signal indicating detection of a voting mark.

9. The read head of claim 7 wherein the read head is coupled to a means for transporting the ballot past the read head for scanning down the column of timing marks on the ballot.

10. The read head of claim 9 wherein the electronic means indicates with a first logic output signal when a timing mark has been detected and with a second logic output signal when a voting mark has been detected, and wherein the read head is coupled to a computer, the computer including means to sample the first and the second logic output signals at a predetermined rate as the ballot moves past the read head and for storing the sampled first and second output logic signals in a memory, thereby capturing an electronic image of the first and second columns.

11. An apparatus for counting votes in an election at a central point, the votes being cast on ballots by handwritten marks made within a voting marks area aligned with a printed timing mark corresponding to a choice, the apparatus comprising:
  a chassis;
  hopper means for receiving a stack of ballots, said hopper means supported by the chassis, the ballots having a first column of timing marks and a second column of voting mark areas in which voting marks are handwritten, each voting mark area spatially aligned with a timing mark;
  ballot transport means supported by the chassis and cooperating with the hopper means for picking a ballot from the hopper means and transporting it in a predetermined direction with the ballot being oriented such that the columns of timing marks are parallel to the predetermined direction;
  a read head cooperating with the ballot transport means for scanning down the first and second columns on a ballot being transported by the ballot transport means, the read head including:
    means for illuminating a portion of the ballot containing the first and second columns, the means for illuminating including:
      a first emitter for illuminating a portion of the first column of timing marks with substantially infrared radiation; and
      a second emitter for illuminating a portion of the second column of voting mark areas with substantially red radiation;
    lens means for focusing an image of the illuminated ballot;
    a first photodiode positioned to receive part of the image of the illuminated portion of the ballot containing an image of the first column; and
    a second photodiode positioned to receive a part of the image of the illuminated portion of the ballot containing of an image of the second column;
    aperture forming means having defined therein first and second apertures overlaying, respectively, the first and second photodiodes, the first aperture having predefined dimensions capable of resolving timing marks and the second aperture having predefined dimensions capable of resolving voting marks having a predetermined minimum size; and
    electronic means coupled to each read head for detecting changes in output levels of the photodiodes and for indicating those changes with output logic signals; and
  a computer supported by the chassis and coupled to the electronic means for sampling the output logic signals from the electronic means at a predetermined rate and storing the data values corresponding to the logic signals in a memory, thereby creating an electronic image of the first and second columns.

12. The apparatus of claim 11 wherein:
  the ballot further includes a third column of timing marks spaced-apart from the first column of timing marks, the first and third spaced-apart columns of timing marks printed with an ink that absorbs infrared light, the first and third columns of timing marks defining therebetween a second column of voting mark areas between horizontally adjacent pairs of timing marks in which voting marks are
  . handwritten;
  the means for illuminating including further includes a third infrared emitter for illuminating a portion of the third column of timing marks;
  the read head further includes a third photodiode positioned to receive a part of the image of the illuminated ballot portion containing an image of the third column; and the aperture forming means further includes a third aperture overlaying the third photodiode, the third aperture having predefined dimensions capable of resolving timing marks.

13. The apparatus of claim 12 wherein:
the electronic means includes:
   amplifier means for amplifying an output signal from each photodiode;
   clamping means for clamping the amplified output signals of each photodiode to a predetermined background level for all ballots;
   means for logically ANDing the amplified output signals from the first and third photodiodes; and
   comparator means for comparing the ANDed output signals of the first and third photodiodes with a first predetermined reference level signal and for comparing the amplified output signal of the second photodiode with a second predetermined reference level signal to produce a first logic signal and a second logic signal; and
wherein the computer samples the first and second logic signals for storage in memory thereby creating an electronic image of the ballot.

14. A read head for optically scanning votes cast on ballots by handwritten marks made within a voting column between a pair of printed timing marks corresponding to a choice, the read head comprising:
   means for illuminating a portion of a ballot having first and second spaced-apart columns of timing marks printed with an ink that absorbs infrared light, the two columns of timing marks defining therebetween a third column of voting mark areas between horizontally adjacent pairs of timing marks in which voting marks are handwritten; the means for illuminating including:
      a first emitter for illuminating a portion of the first column of timing marks with substantially infrared radiation;
      a second emitter for illuminating a portion of the second column of timing marks with substantially infrared radiation; and
      a third emitter for illuminating a portion of the third column of voting mark areas with substantially red radiation; and
   means for electronically capturing an image of the illuminated portion of the ballot including:
   lens means for focusing an image of the illuminated ballot;
   light sensing means for receiving the focused image, the light sensing means including first, second and third light sensors; the first, second and third light sensors being positioned to receive, respectively, the image of the illuminated portion of the first, second and third columns; and
   electronic means coupled to each light sensor for detecting changes in output levels of light sensors, for indicating that an image of two timing marks has been received and for indicating that a voting mark has been received by the light sensing means.

15. The read head of claim 14 wherein first, second and third light sensors are photodiodes, and wherein the means for electronically capturing an image further includes aperture forming means overlaying the photodiodes to define the portions of the image of the illuminated portion of the ballot to be sensed.

16. The read head of claim 15 wherein the aperture forming means includes:
   first and second apertures overlaying the first and the second photodiodes, the apertures having dimensions providing resolution for at least a portion of a timing mark; and
   a third aperture overlaying the third photodiode having dimensions providing resolution of a voting mark of a predetermined minimum size.

17. The read head of claim 15 wherein the electronic means includes:
   amplifier means for amplifying an output signal from each photodiode;
   clamping means for clamping the amplified output signals of each photodiode to a predetermined white level for images of backgrounds for all ballots;
   means for logically ANDing the amplified output signals from the first and second photodiodes; and
   comparator means for comparing the ANDed output signals with a first predetermined reference level signal and for comparing the amplified output signal of the third photodiode with a second predetermined reference level signal to produce a first logic signal indicating the detection of two timing marks and a second logic signal indicating detection of a voting mark.

18. The read head of claim 15 wherein the read head is coupled to a means for transporting the ballot past the read head for scanning down the first and second columns of timing marks on the ballot.

19. The read head of claim 18 wherein the electronic means indicates with a first logic output signal when two timing marks have been detected coincidentally and with a second logic output signal when a voting mark has been detected; and wherein the read head is coupled to data processing means, the data processing means sampling the first and the second logic output signals at a predetermined rate as the ballot moves past the read head, and storing the sampled first and second logic output signals in a memory, thereby capturing an electronic image of the ballot.

20. A read head for optically scanning votes cast on ballots by handwritten marks made within a voting column between a pair of printed timing marks corresponding to a choice, the read head comprising:
   means for illuminating a portion of a ballot having first and second spaced-apart columns of timing marks, the two columns of timing marks defining therebetween a third column of voting mark areas between horizontally adjacent pairs of timing marks in which voting marks are handwritten; the means for illuminating including:
      a first emitter for illuminating a portion of the first column of timing marks with substantially infrared radiation:
      a second emitter for illuminating a portion of the second column of timing marks with substantially infrared radiation; and
      a third emitter for illuminating a portion of the third column of voting mark areas with substantially red radiation;
   lens means for focusing an image of the illuminated ballot;
   first, second and third photodiodes being positioned to receive, respectively, the part of the image of the illuminated portion ballot containing an image of the first column, the part of the image of the illuminated portion ballot containing of an image of the third column of voting mark areas, and the part of the image of the illuminated portion ballot containing an image of the second column;

aperture forming means having defined therein first, second and third apertures overlaying, respectively, the first, second and third photodiodes; the first and third apertures having predefined dimensions capable of resolving timing marks and the second aperture having predefined dimensions for resolving voting marks having a predetermined minimum size; and electronic means coupled to each photodiode for detecting changes in output levels of photodiodes and for indicating that an image of two timing marks and a voting mark had been received by the light sensing means.

21. The read head of claim 20 wherein the electronic means includes:

amplifier means for amplifying an output signal from each photodiode;

clamping means for clamping the amplified output signals of each photodiode to a predetermined white level for images of backgrounds for all ballots; and means for logically ANDing the amplified output signals from the first and third photodiodes; and comparator means for comparing the ANDed output signals with a first predetermined reference level signal and for comparing the amplified output signal of the second photodiode with a second predetermined reference level signal to produce a first logic signal indicating the detection of two timing marks and a second logic signal indicating detection of a voting mark.

22. The read head of claim 20 wherein the read head is coupled to a means for transporting the ballot past the read head for scanning down the first and second columns of timing marks and the third column of voting mark areas on the ballot.

23. The read head of claim 22 wherein the electronic means indicates with a first logic output signal when two timing marks have been detected coincidentally and with a second logic output signal when a voting mark has been detected, and wherein the read head is coupled to a computer, the computer including means to sample the first and the second output logic signals at a predetermined rate as the ballot moves past the read head and storing the sampled first and second logic output signals in a memory, thereby capturing an electronic image of the ballot.

* * * * *